(12) United States Patent
Walker et al.

(10) Patent No.: US 8,437,281 B2
(45) Date of Patent: May 7, 2013

(54) DISTRIBUTED REAL-TIME DATA MIXING FOR CONFERENCING

(75) Inventors: Douglas Jay Walker, Raleigh, NC (US); Bryan Turner, Cary, NC (US); Charles L. Baker, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1463 days.

(21) Appl. No.: 11/691,657

(22) Filed: Mar. 27, 2007

(65) Prior Publication Data
US 2008/0239997 A1 Oct. 2, 2008

(51) Int. Cl.
*H04L 12/16* (2006.01)
(52) U.S. Cl.
USPC .................. 370/259; 370/263; 370/265
(58) Field of Classification Search .................. None
See application file for complete search history.

(56) References Cited

U.S. PATENT DOCUMENTS

| | | |
|---|---|---|
| 4,550,443 A | 10/1985 | Freeburg |
| 5,355,367 A | 10/1994 | Comroe et al. |
| 5,410,732 A | 4/1995 | Ames et al. |
| 5,491,688 A | 2/1996 | Bocci et al. |
| 5,583,913 A | 12/1996 | Taketsugu |
| 5,710,974 A | 1/1998 | Granlund |
| 5,719,871 A | 2/1998 | Helm et al. |
| 5,794,149 A | 8/1998 | Hoo |
| 5,850,607 A | 12/1998 | Muszynski |
| 5,867,491 A | 2/1999 | Derango et al. |
| 5,920,817 A | 7/1999 | Umeda et al. |
| 5,999,815 A | 12/1999 | TenBrook et al. |
| 6,038,452 A | 3/2000 | Strawczynski et al. |
| 6,044,270 A | 3/2000 | Raith |
| 6,058,107 A | 5/2000 | Love et al. |
| 6,069,885 A | 5/2000 | Fong et al. |
| 6,112,058 A | 8/2000 | Walters et al. |
| 6,151,502 A | 11/2000 | Padovani et al. |

(Continued)

OTHER PUBLICATIONS

M. Irie, K. Hyoudou, and Y.Nakayama, Tree-based Mixing: A New Communication Model for Voice-over-IP Conferencing Systems, Proceedings of the Ninth IASTED International Conference, Aug. 15, 2005, pp. 353-358, vol. chess.cs.uec.ac.jp, No. ~irie-m/477-070.pdf, Publisher: International Association of Science & Technology for Development, Published in: Calgary, Canada and Internet.

(Continued)

*Primary Examiner* — Robert Wilson
(74) *Attorney, Agent, or Firm* — Lempia Summerfield Katz LLC

(57) ABSTRACT

In one embodiment, a method includes receiving data that indicates a maximum number of end nodes with which to set up real-time data sessions that is less than a conference number of nodes whose data is mixed in a single real-time data conference. Real-time data sessions are established with a connected set of a connected number of nodes not greater than the maximum number. A mix of the real-time data received from the connected set is presented to a user of the first node. Local real-time data is received from a user. The received real-time data is distributed by mixing and sending. This includes, for each individual node in the connected set, mixing received local real-time data with real-time data received from other nodes in the connected set different from the individual node to form individual mixed real-time data, and sending the individual mixed real-time data to the individual node.

27 Claims, 8 Drawing Sheets

U.S. PATENT DOCUMENTS

| | | |
|---|---|---|
| 6,222,830 B1 | 4/2001 | Padovani et al. |
| 6,233,454 B1 | 5/2001 | Sato |
| 6,262,980 B1 | 7/2001 | Leung et al. |
| 6,263,204 B1 | 7/2001 | Kusaki et al. |
| 6,295,450 B1 | 9/2001 | Lyer et al. |
| 6,348,880 B1 | 2/2002 | Xu |
| 6,359,877 B1 | 3/2002 | Rathonyi et al. |
| 6,442,401 B1 | 8/2002 | Behan |
| 6,496,700 B1 | 12/2002 | Chawla |
| 6,516,196 B1 | 2/2003 | Chen et al. |
| 6,535,738 B1 | 3/2003 | Bomar et al. |
| 6,549,542 B1 | 4/2003 | Dong et al. |
| 6,570,871 B1 | 5/2003 | Schneider |
| 6,594,229 B1 | 7/2003 | Gregorat |
| 6,603,751 B1 | 8/2003 | Odenwalder |
| 6,611,513 B1 | 8/2003 | ten Brink |
| 6,628,632 B1 | 9/2003 | Dolan |
| 6,647,262 B1 | 11/2003 | Demetrescu et al. |
| 6,691,273 B2 | 2/2004 | Wager et al. |
| 6,697,642 B1 | 2/2004 | Thomas |
| 6,728,296 B1 | 4/2004 | Yung |
| 6,782,413 B1 * | 8/2004 | Loveland ................... 709/204 |
| 6,785,254 B2 | 8/2004 | Korus et al. |
| 6,909,698 B1 | 6/2005 | Moon |
| 6,944,123 B1 | 9/2005 | Moon |
| 7,016,322 B1 | 3/2006 | Moon |
| 7,023,810 B1 | 4/2006 | Moon |
| 7,061,886 B1 | 6/2006 | Moon |
| 7,088,695 B1 | 8/2006 | Moon |
| 7,103,019 B1 | 9/2006 | Moon |
| 7,298,834 B1 * | 11/2007 | Homeier et al. ......... 379/202.01 |
| 7,496,856 B2 * | 2/2009 | Beezer et al. ................. 715/802 |
| 7,738,406 B2 * | 6/2010 | Liu et al. ...................... 370/256 |
| 7,849,138 B2 * | 12/2010 | Gu et al. ....................... 709/205 |
| 7,852,786 B2 * | 12/2010 | Wang et al. ................... 370/254 |
| 2001/0008522 A1 | 7/2001 | Padovani et al. |
| 2001/0034237 A1 | 10/2001 | Garahi |
| 2002/0027890 A1 | 3/2002 | Bernstein et al. |
| 2002/0058481 A1 | 5/2002 | Mohebbi |
| 2002/0075889 A1 | 6/2002 | Rong et al. |
| 2002/0095635 A1 | 7/2002 | Wager et al. |
| 2002/0110088 A1 | 8/2002 | Lundby et al. |
| 2002/0114332 A1 | 8/2002 | Apostolopoulos et al. |
| 2002/0118665 A1 | 8/2002 | Cleveland et al. |
| 2003/0063582 A1 | 4/2003 | Mizell et al. |
| 2003/0195001 A1 | 10/2003 | Tari et al. |
| 2009/0303902 A1 * | 12/2009 | Liu et al. ...................... 370/254 |

OTHER PUBLICATIONS

YimaCast: A Collaborative Distributed Audio Chat System; 2004; p. 111-116.

Stolowitz Ford Cowger LLP; Listing of Related Cases; Nov. 19, 2009; 1 page.

\* cited by examiner

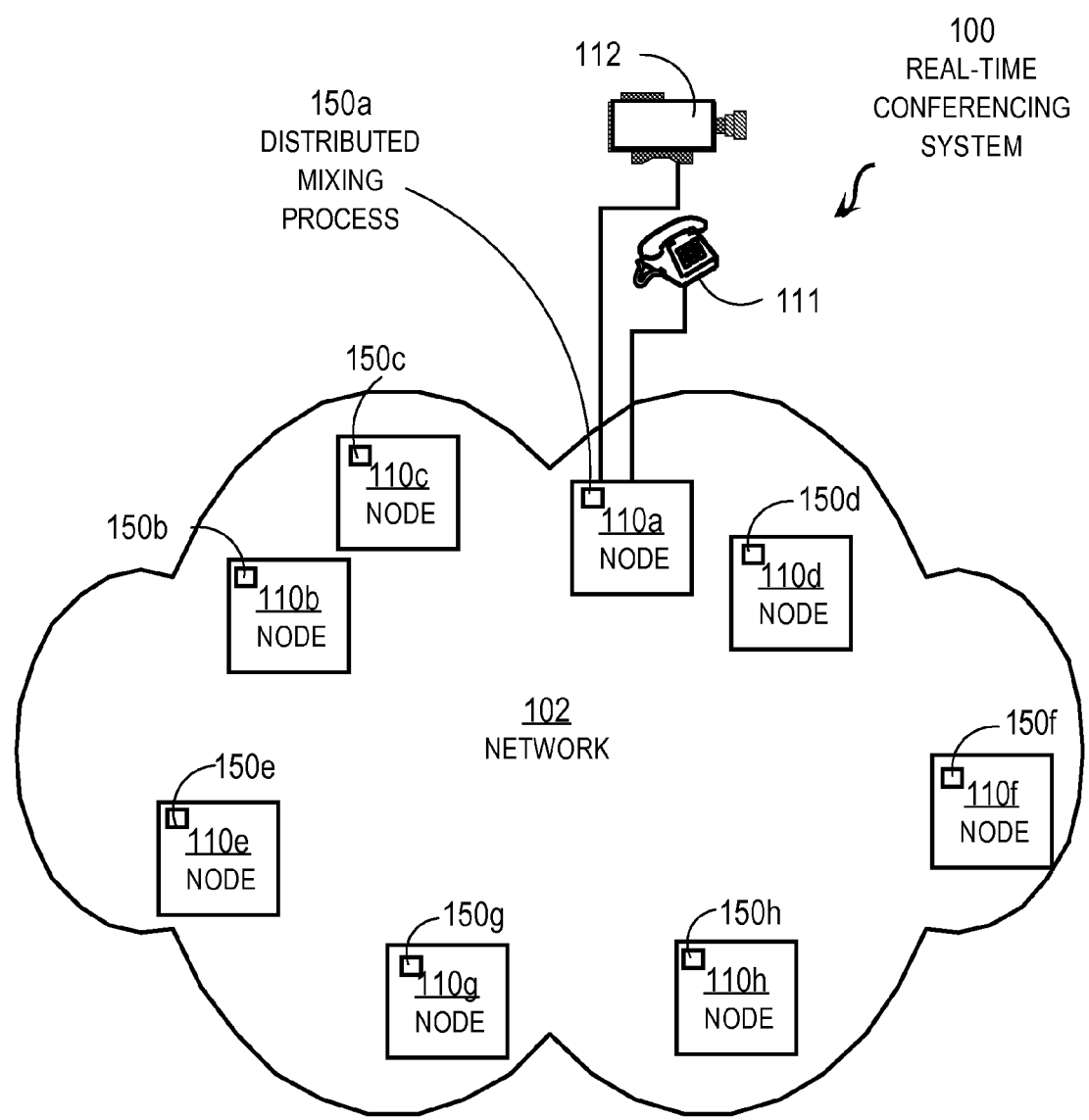

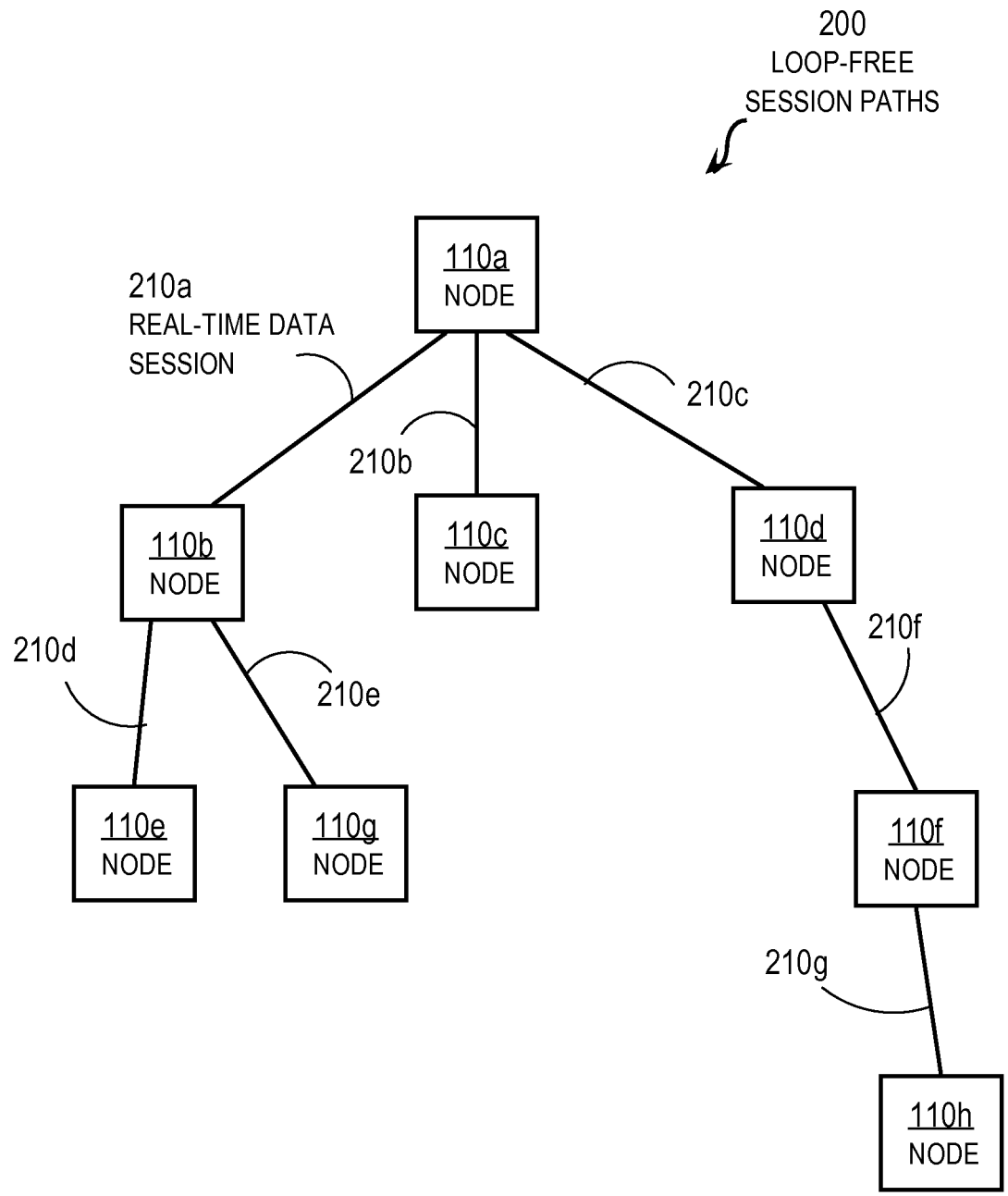

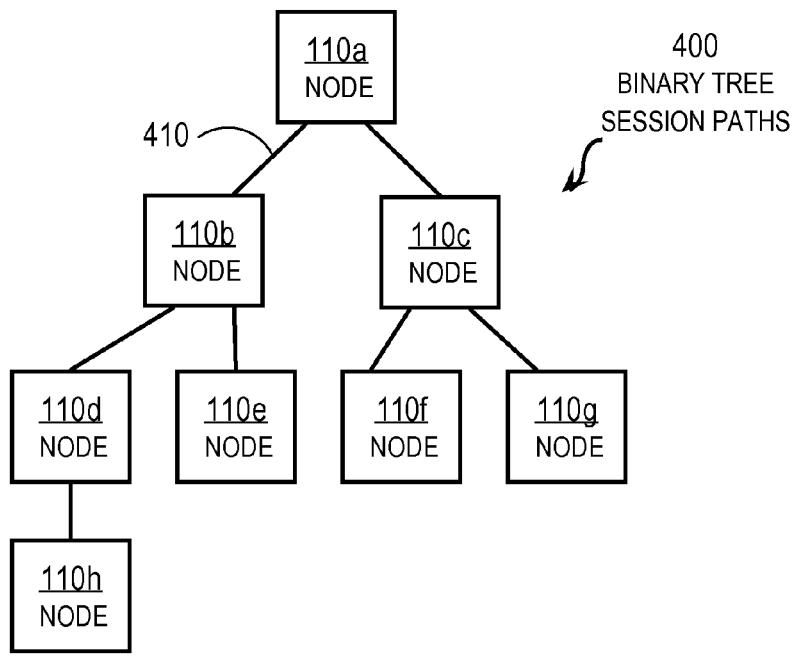
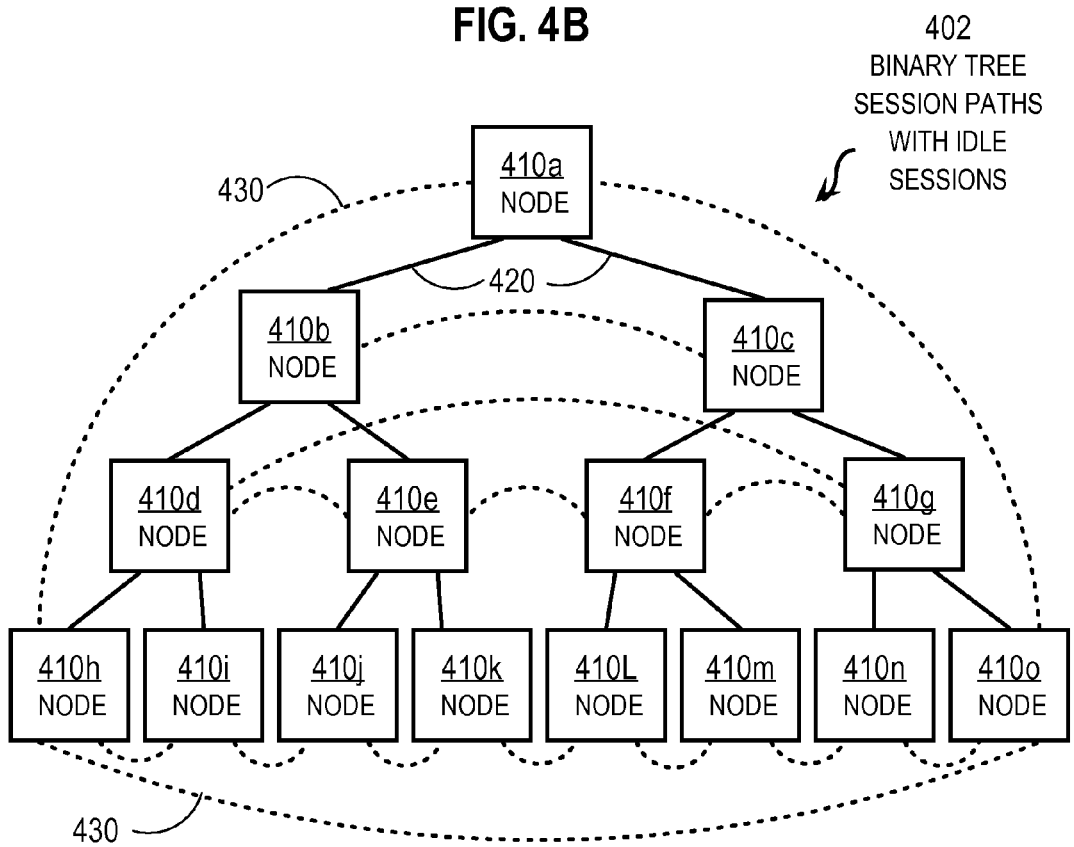

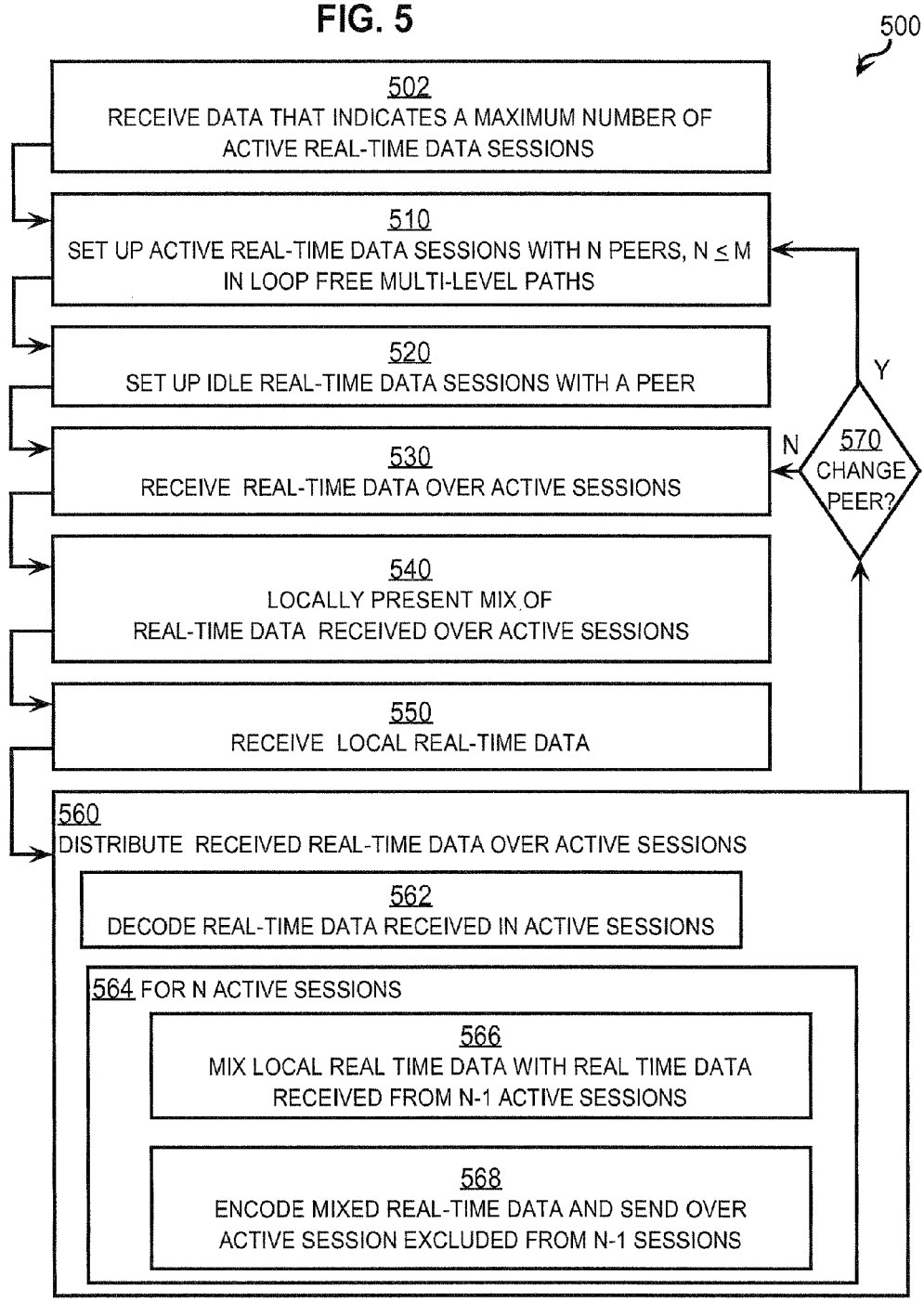

DISTRIBUTED REAL-TIME DATA MIXING FOR CONFERENCING

BACKGROUND OF THE INVENTION

1. Field of the Invention

The present invention relates to real-time data conferencing in a network, such as voice conferencing over a packet switched data network.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

A valuable application that uses such a network is a voice application that transports voice data between end nodes in near-real time. In recent years, applications that transport voice data have been enhanced to provide voice conferencing among multiple end nodes. Such applications involve a voice conference server to which each end node sends voice data. For each end node participating in the voice conference, the server receives a voice data stream, combines voice data received from all the other end nodes and sends that mixed voice signal to each node. For 5 end nodes, the server receives 5 voice data streams, combines them four at a time five different ways and sends out five different combinations of the five streams (each combination a mix of 4 input streams).

A problem with such applications is that the server power and bandwidth must increase with an increase in the number of end nodes engaged in the voice conferencing. For servers that attempt to provide this application for hundreds of conferences of several to dozens of end nodes each, the processing power and bandwidth demands on a single server become daunting.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example distributed real-time conferencing system;

FIG. 2 illustrates an example hierarchy of real-time data sessions for loop-free paths;

FIG. 4A illustrates an example binary tree hierarchy of real-time data sessions;

FIG. 4B illustrates an example binary tree hierarchy with idle real-time data sessions for quick recovery from failure of an active real-time data session;

FIG. 5 illustrates at a high level an example method for each end node in the distributed real-time conferencing system; and FIG. 6A

DESCRIPTION OF EXAMPLE EMBODIMENTS

Figure 3A:
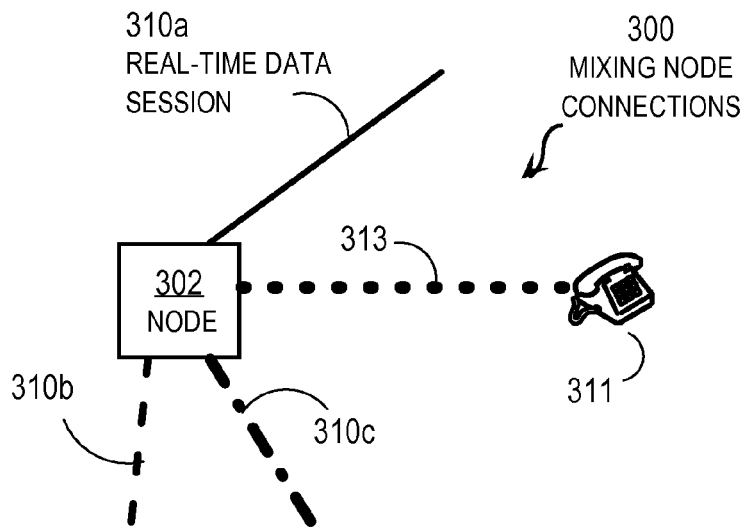
FIG. 3A illustrates example mixing node connections in the distributed real-time conferencing system.

Techniques are described for distributed real-time conferencing. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described in the context of voice conferencing in an Internet Protocol (IP) packet-switched network by distributing the mixing of real-time data among all end nodes. However, the invention is not limited to this context. In other embodiments, other types of real-time or near-real time data are used in conferencing among two or more nodes using the same or different protocols in the same or different networks by spreading the mixing operations among the same or different end nodes or intermediate nodes.

1.0 Overview

In one set of embodiments, a method includes receiving, at a first network node, data that indicates a maximum number of nodes with which the first node may set up real-time data sessions that is less than a conference number of nodes whose data is mixed in a single real-time data conference. Real-time data sessions are set up with a connected set of nodes, wherein the connected set includes a connected number of nodes not greater than the maximum number. Real-time data is received from up to all nodes in the connected set and distributed. The real-time data is distributed by performing, for each individual node in the connected set, mixing and sending. Real-time data received from up to one less than the connected number of other nodes in the connected set different from the individual node is mixed to form individual mixed real-time data. The individual mixed real-time data is sent to the individual end node.

In other sets of embodiments, an apparatus or a computer readable medium is configured to perform one or more steps of one or more of the above methods.

2.0 Network Overview

FIG. 1 illustrates an example distributed real-time conferencing system 100. The system 100 includes network 102 with end node 110a, end node 110b, end node 110c, end node 110d, end node 110e, end node 110f, end node 110g and end node 110h (collectively referenced hereinafter as end nodes 110). In other embodiments, the same, more or fewer nodes are connected over the same or more networks.

Each end node 110 includes devices for capturing and presenting real-time data. As used herein, real-time data is sensory data, such as audio data and visual data, that is captured from one user and presented to a different user in about the time a user perceives any presented data. The exact delay between capture and presentation depends on the application and, in various embodiments, ranges from about 0.1 seconds to about 4 or 5 seconds. For example, node 110a includes an audio speaker and receiver in the form of telephone device 111, a video capture device in the form of video camera 112, and video display device (e.g., display 714 in FIG. 7 that is described in more detail in a later section). In other embodiments, other devices are used for sensory capture and presentation, e.g., a desktop or headset microphone and audio speakers in lieu of telephone device 111.

In an existing approach to voice conferencing among multiple nodes, also called "chat," all end nodes that participate in a conference establish real-time data sessions with a central server, not shown. Any method may be used to set up real-time data sessions over network 102. For example, signaling on a packet switched network can be used to set up circuits in a circuit switched network, like the telephone network. Many methods have been used to set up sessions in a packet switched network, including asynchronous transfer mode (ATM) and Frame Relay virtual circuits. More recent protocols for real-time data transfer over the Internet Protocol, which transects multiple heterogeneous network link media, include the Real-Time Protocol (RTP) and the Session Initiation Protocol (SIP). Hereinafter, the term session refers to a real-time data session, unless otherwise clear from the context.

For example, to provide voice conferencing for the eight nodes 110 depicted in FIG. 1 in a packet-switched network, each end node 110 establishes a voice session with a chat server (not shown). The chat server, receives 8 real-time data packet streams, decodes the 8 data packet streams to produce voice data streams, mixes 7 voice streams at a time to produce 8 different output streams, and outputs the 8 streams over the 8 sessions. The output for a particular node does not include the input from that node. For example, the voice streams decoded from real-time data streams that arrive at the chat server from nodes 10*b*, 110*c*, 110*d*, 110*e*, 110*f*, 110*g*, 110*h* are mixed together and encoded and sent as data packet stream to node 110*a*. The data stream from end node 110*a* is not included in the mix sent to node 110*a*. For purposes of illustration this is considered to take 8 units of work per unit of time to decode the 8 data packet streams, eight units of work to generate 8 differ mixes, and 8 more units of work to encode the 8 different mixes for a total effort of 24 units of work per unit of time on the chat server.

To support a thousand conferences averaging eight end nodes per conference, the chat server must handle 24,000 work units per unit time. For purposes of illustration, it is further assumed that a single end node has the capacity to handle 24 work units. Thus the chat server in this example must have 1000 times the capacity of a typical end node. As the size of the network 102 increases and the number of conferences increase, the capacity of the chat server must increase even more. To support video conferencing, the server must be even more capable. The capacity of the network 102 to support conferencing is bottlenecked by the capacity of the conferencing server.

According to various embodiments of the invention, the load to support real-time data conferencing is distributed among a plurality of network nodes, such as the end nodes participating in the conference. In some embodiments, two or more intermediate network nodes share the load of the real-time data conferencing. In an illustrated embodiment, a distributed mixing process operates on two or more end nodes participating in the conference. For example, distributed mixing process 150*a*, distributed mixing process 150*b*, distributed mixing process 150*c*, distributed mixing process 150*d*, distributed mixing process 150*e*, distributed mixing process 150*f*, distributed mixing process 150*g* and distributed mixing process 150*h* (collectively referenced hereinafter as distributed mixing process 150) operates on node 110*a*, node 110*b*, node 110*c*, node 110*d*, node 110*e*, node 110*f*, node 110*g* and node 110*h*, respectively.

3.0 Loop-Free Paths of Sessions

According to some embodiments, the multiple nodes that share the load of real-time voice conferencing are connected by real-time data sessions that are strung together to form loop free paths among all the end nodes participating in a conference. The paths of connected sessions are loop free to prevent sending real-time data received from a node back to that same node. It is noted that the current approach in which every end node establishes a single real-time data session with one server also provides a set of loop free paths, however, no other node on those loop free paths mixes real-time data streams except the server.

3.1 Tree Hierarchy

FIG. 2 illustrates an example hierarchy of real-time data sessions for loop-free paths. One of the end nodes, e.g., node 110*a*, serves as a root of a tree which is a graph of connected nodes in which no node can have more than one parent and any node can have multiple children. A connection is formed by a real-time data session. A root node is a node with no parent; and a leaf node is a node with no children. Node 110*a* is a root node that has three children nodes, node 110*b*, 110*c*, 110*d* to which node 110*a* is connected by corresponding real-time data sessions 210*a*, 210*b*, 210*c*, respectively. Node 110*b* has two children, node 110*e* and node 110*g* to which node 110*b* is connected by corresponding real-time data sessions 210*d*, 210*e*, respectively. Node 110*c* has no children and is therefore a leaf node. Node 110*d* has one child, node 110*f* to which node 110*d* is connected by real-time data session 210*f*. Node 110*f* has one child, node 110*h* to which node 110*f* is connected by real-time data session 210*g*.

Because no node has more than one parent, the paths form a tree hierarchy that is loop free. There is one and only one path that connects any node to any other node. For example, the path from node 110*b* to node 110*f* consists of the sequence of end nodes 110*b*, 110*a*, 110*d*, 110*f* connected by sessions 210*a*, 210*c*, 210*f*, respectively. Each node in the sequence has a real-time data session with an immediately following node in the sequence.

Because there are no loops, each node receiving more than one real-time data stream can participate in mixing real-time data streams without causing a node to receive back a real-time data stream sent by that same node. Since all end nodes that participate have a local real-time data stream and at least one parent or one child, each node participates in the mixing of some real-time data formerly performed only by a server.

Because the processing power at most intermediate nodes and end nodes is limited, each node is limited to a maximum number of real-time data sessions. This maximum is designated herein by the capital letter M. The maximum for a particular node is designated by M followed by a lower case letter of the callout number for a corresponding node. For example, node 110*a* is limited to Ma real-time data sessions. In some embodiments, the maximum M depends on the processing power of the node and the other functions the node is designed to perform. In some embodiments, a single maximum is used for all nodes that participate in mixing real-time data, e.g., M=3 for all nodes.

Any method may be used to form loop-free session paths. For example, in some embodiments an order of joining is used to establish a loop-free hierarchy. A node already in the conference (e.g., connected by a real-time data session with another node) is considered a parent to any node subsequently requesting to join the conference and may not request a new real-time data session with any other node already in the conference. In some embodiments, different conferences can be distinguished by a unique conference number provided by a central authority. In the illustrated embodiment, each node is allowed to belong to only one conference at a time, so that a unique conference number is not used. The first node, which initiates the conference, has no parent and becomes the root node. A node that can accept no more children sessions redirects a new node requesting a new session to a different node up or down the hierarchy.

It is assumed for purposes of illustration that the end nodes of FIG. 1 join a real-time conference in order of the callout numbers. Thus the nodes join the conference in the order 110a, 110b, 110c, 110d, 110e, 110f, 110g, 110h. It is further assumed that for node 110a, Ma=3, for node 110b Mb=3, for node 110c Mc=1, for node 110d Md=2 and for leaf nodes 110e, 110g, 110f and 110f, Me=Mg=Mf=Mh=4. It is further assumed that all nodes wishing to join the conference are initially directed to the root node. Node 110a is the first node and becomes the root node. Node 110b requests to join. Node 110a has room for three children and grants the request. A real-time data session 210a is set up between node 110b as a child and node 110a as the parent. The same steps are repeated as nodes 110c and 110d join the conference. This fills the second level (or generation) of the hierarchy of distributed mixing nodes. When node 110e requests to join the conference by setting up a session with node 110a, node 110a has reached its maximum number Ma and can establish no more sessions; so node 110a refuses and redirects node 110e to a child node of the requested node. For example, node 110a redirects node 110e to node 110b. Node 110e requests to join the conference as a child of node 110b. Node 10b has only one session with node 110a and is allowed 3 (Mb=3), so node 110b grants the request and node 110e establishes a session 210d with node 110b as a child of node 110b. When node 110f request node 110a to join the conference, node 110a again redirects to a child node. It is assumed that node 110a redirects to child node 110c. Node 110c can not accept another child because MC=1 and node 110c redirects back to node 110a. Node 110a then redirects to another child node, node 110d. Node 110d has room for another child (Md=2) so a session 210f is set up with node 110f. In a similar fashion, when node 110g attempts to join it is redirected to node 110b which grants the request; and node 110h is redirected to node 110d which redirects to node 110f which grants the request and forms session 210g with node 110h as a child.

In one approach, the tree is made simpler by requiring each node to handle at least a minimum number of sessions. For example, in some embodiments, each non-root node is required to have an M of 3 to support an binary tree structure. The root node is allowed to have an M of 2 because the root node has no parent. FIG. 4A illustrates an example binary tree hierarchy 400 of real-time data sessions. This tree 400 is a binary tree for the illustrated conference involving the eight nodes that are joined as children in the order in which requests are made, namely, end node 110a as the root, end nodes 110b and 110c as the two binary children of end node 110a, end nodes 110d and 110e as the binary children of end node 110b and end nodes 110f and 110g as the binary children of end node 110c, and end node 110h as a child of end node 110d.

In other embodiments, nodes are added to a tree hierarchy using a different method. For example, new nodes requesting to join a conference are redirected to a node which has some greater affinity for the new node. Any measure of affinity may be used, alone or in any combination. For example, in some embodiments higher affinity is associated with a lower latency of traffic between the new node and the node to which it is redirected. In some embodiments, higher affinity is associated with a higher reliability for traffic between the new node and the node to which it is redirected. In some embodiments, higher affinity can be associated with a more important social relationship between a user of the new node and a user of the node to which it is redirected, such as belonging to the same organization or division within an organization. In some embodiments, a session with a child node is terminated in favor of a new node with greater affinity for the parent. In some embodiments, the measure of affinity is determined for the hierarchy as a whole and the new node (or displaced child node) is redirected to maximize affinity in the hierarchy as a whole.

By forming only sessions that produce loop free paths among all mixing nodes in the conference, each node may mix all the received real-time data to form output real-time data, as long as no real-time data is sent out over the session through which it arrived.

3.2 Tree Node Mixing

FIG. 3A illustrates example mixing node connections 300 in the distributed real-time conferencing system. The connections 300 include the mixing node 302, a real-time data session 310a with a parent node, and two real-time data sessions 310b and 310c with child nodes. This mixing node 302 is an end node because it includes a local source of real-time data and a local presentation device for real time data. In the illustrated embodiment, the local source and presentation device is telephone 311. Real-time data is passed between the local node 302 and the telephone 311 on a local real-time data connection 313. In mixing nodes that are not end nodes, a device like telephone 311 and local real-time data connector 313 are absent. Different line types are used for the different real-time data connections 310a, 310b, 310c and 313 to better illustrate in FIG. 3B the mixing and sending of real time data streams done at the node 302.

Figure 3B:
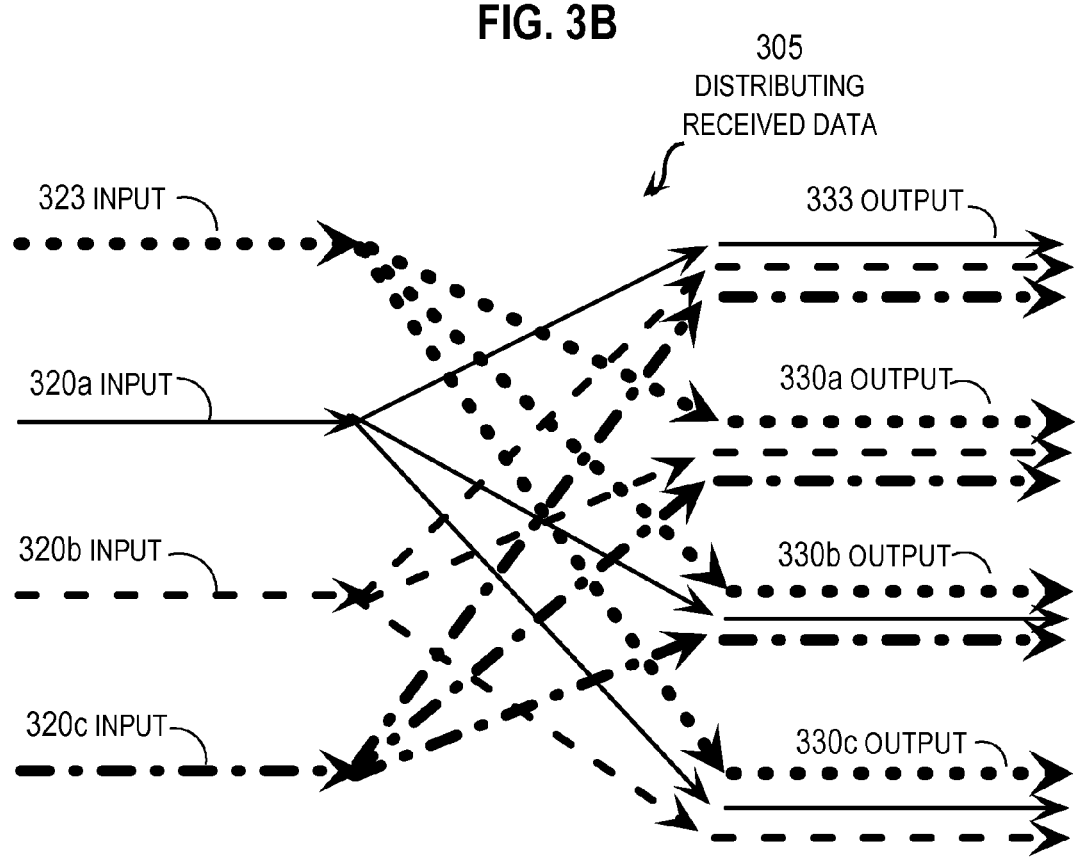
FIG. 3B illustrates example distributing of real-time data at the example mixing node.

FIG. 3B illustrates example distributing 305 of received real-time data at the example mixing node 302. Input 323 indicates the real-time data stream received at node 302 on local connection 313. Input 320a indicates the real-time data stream received at node 302 through real-time data session 310a. Input 320b indicates the real-time data stream received at node 302 through real-time data session 310b. Similarly, input 320c indicates the input real-time data stream received at node 302 through real-time data session 310c. Three copies of these data streams are made and output over three of the four outputs at node 302. Output 333 indicates the real-time data streams mixed at node 302 and sent over local connection 313 to the local presentation device 311. Note that the local output 333 carries a combinations of the real time data received at all other connections and excludes the data received on the local input 323. Similarly, output 330a indicates the real-time data streams mixed at node 302 and sent over session 310a to the parent node. Output 330b indicates the real-time data streams mixed at node 302 and sent over session 310b to one child node; and output 330c indicates the real-time data streams mixed at node 302 and sent over session 310c to the other child node. As seen with the local output 333, these outputs 330a, 330b, 330c carry a combinations of the local real time data received at node 302 on the local connection 313 and all other sessions, excluding the data received on the input for the same session.

The work done at node 302 is the same, no matter how many nodes lie upstream or downstream of the node because data from those nodes far upstream have already been mixed at intervening nodes. Because there are no loops, the real-time data sent out by node 302 does not return to node 302. It is assumed for purposes of illustration that the real time data is voice that is encoded before being loaded into data packets sent through a real-time data session. The amount of work done by node 302 per unit time is therefore 3 units to decode the input on 320a, 320b, 320c, plus 4 units to make the four mixtures shown on outputs 333, 330a, 330b, 330c, plus 3 units to encode the output on 330a, 330b, 330c for a total of 10 work units. It is noted that local real-time data does not need to be decoded or encoded. It is assumed for purposes of illustration that 10 units of work on an ordinary capacity end node represents about 20% of its capacity, leaving 80% for other functions on the end node. This load does not increase as more nodes on the network join the conference or more conferences are formed over the network 102. Thus by distributing the load over the multiple mixing nodes, no single server node has to have the power to perform 24,000 work units. Hundreds of ordinary capacity end nodes already in place on the network provide the same real-time data conferencing capacity as one extremely powerful and expensive chat server.

3.3 Tree Latency

There is an increase in latency using the distributed nodes rather than a single chat server in some circumstances. To demonstrate the increased latency, it is assumed that each real-time data session introduces 0.1 seconds of delay in presenting real-time data at one node that was received at another. The chat server approach then introduces 0.2 seconds delay between any two end nodes, e.g., between end node 110e and end node 110h. The hierarchy 200 introduces a delay of up to 0.5 seconds, which becomes greater the more levels are added to the hierarchy. Delays between other pairs of nodes are less. For example, the delay between node 110b and nodes 110c and 1110d is only 0.2 seconds. The effect of such delays can be mitigated by any of several design factors taken alone or in combination.

For example, the value of M for each node can be selected to make maximum use of processing power on each node. More capable nodes can have more children. The more children at each level, the fewer levels needed to engage all the participating end nodes. The hierarchy can be made as compact as possible, with the fewest number of levels. For example, in some embodiments the hierarchy is arranged to move nodes with higher values of M toward the root of the hierarchy and nodes with smaller values of M toward the leaves. This is implemented in some embodiments by defining the measure of affinity for a node in terms of the value M for a node. For nodes of the same value of M, in some embodiments, the measure of affinity decreases with a number of hops through intermediate nodes used by a session so that nodes closest in terms of number of hops across network 102 are more likely to become a parent-child pair in the hierarchy.

In some embodiments, one or more measures of affinity are combined as independent dimensions of a Voronoi space, and the new node is redirected to a connected node already in the conference that is closest in the Voronoi space to the new node.

In some embodiments, to diminish the contribution of real-time data from nodes with less affinity, the inputs from other nodes are diminished before being combined on the outputs. Thus, in the hierarchy of 200, a user of node 110e will hardly hear the voice of the user at node 110h, but will hear loudly the voice of the user at node 110a or 110b. Therefore, the more delayed voices are filtered out of the conference. This technique works well in embodiments in which nodes are arranged in the hierarchy based on socially important relationships. Nodes with little importance to each other are many sessions apart; and the voices of their users are most muffled or entirely inaudible.

In some embodiments, users of the network are arranged as lecturer and audience, with the lecturer at the root and the audience at the leaves. An audience member must request permission (e.g., obtain a token) to speak and the voice of an audience member is only propagated when that member has permission. Longer delays are tolerable in this circumstance. Similarly, special audience members, such as members of a panel, are placed closer to the root than other audience members. In these embodiments, the panel has a greater affinity measure for the node of the lecturer than does a node of a member of the rest of the audience.

3.4 Tree Resilience

When a connected node terminates a real-time data session before an end to a conference the remaining node may have to take steps to reconnect to other nodes still participating in the conference. In some embodiments, a node ignores a child node that terminates a real-time session but attempts to establish a new session when a parent node terminates a session. In these embodiments, a node that loses a session with a parent node requests to join any other node still in the conference and follows any re-directs until a node in the conference grants the request. For example, the node that loses a session with a parent sends a request to join a parent of the lost parent, if known, or the root node, if still in the conference, or some child or grandchild of the root node, if known. In some embodiments, network addresses for all nodes in the conference are exchanged when a node joins a conference and that list is consulted when the node attempts to rejoin the conference after losing a session to a parent node.

Precious time extending over many seconds can be lost in finding and establishing a real-time data session with a new parent node. According to some embodiments, idle sessions are established ahead of time to be used in case of loss of an active session. Such idle sessions are not used, i.e., mixed real-time data is not sent through an idle session or, if sent, is not mixed by the receiving node. If used before an active session is terminated, such idle sessions may cause loops. However, when an active session is terminated before the end of a conference, an idle session judiciously chosen can be activated immediately to retain connection to the conference without the delays of searching for and establishing a new real-time data session. Thus idle sessions provide resilience to the tree of connected mixing nodes in the conference. An example use of idle session for tree resilience is demonstrated with reference to FIG. 4B.

FIG. 4B illustrates an example binary tree hierarchy 402 with idle sessions for quick recovery from active session failure. The binary tree 402 includes active real-time data sessions 420 connecting root node 410a with its binary children in the second level (node 410b and node 410c), and those children with their binary children in the third level (node 410d, node 410e, node 410f, node 410g), and those children with their binary children in the fourth level (node 410h, node 410i, node 410j, node 410k, node 410L, node 410m, node 410n and node 410o). There are no loops created by active sessions 420.

The nodes of binary tree 402 also each establish one or more idle sessions 430. Idle sessions 430 may be implemented in any manner known in the art. For example, in some embodiments, idle sessions are implemented as normal voice over Internet Protocol (VOIP) phone calls that are placed on hold. In some embodiments, idle sessions are implemented as Transport Control Protocol (TCP) connections with periodic keep-alive messages.

In the illustrated embodiment, each node forms an idle session with its sibling (the other binary child of the same parent) and with another member of the same level (i.e., in the same generation) if any. For simplicity, the idle sessions are made between adjacent nodes in the same generation. The leftmost member of a generation makes its second idle session with the rightmost member of a generation. In the second level, involving nodes 410b and node 410c, there is no second idle session because the leftmost and rightmost members are already connected as siblings. In some embodiments a second idle session is made with one or more different nodes, such as the nodes in the next generation which are not their children, e.g., node 410b to node 410g and node 410c to node 410d (not shown). The root node 410a sets up idle sessions with the leftmost node 410h and rightmost node 410o of the lowest level. Thus those nodes have three idle sessions each. Idle sessions are also established between adjacent leaf nodes that are on different levels of the hierarchy, if any. For example, a leftmost child of node 410j (not shown) would establish a left idle session with leaf node 410i to the left of its parent node 410j.

It is noted that if an idle session were to become active and transfer real-time data that gets mixed at the receiving node, loops would be formed that could result in a node receiving back the real-time data that it already forwarded. For example, data forwarded by root node 410a to node 410b would, if sent over an idle session to node 410c, be mixed at node 410c with other data and sent back to the root node 410a. Thus nodes do not mix real-time data receive over idle sessions. It is desirable that nodes not even send real-time data over an idle session.

However, if any node in the tree 402 drops out, thus terminating one or more real-time data sessions with one or more corresponding other nodes, a loop free tree often can be re-formed quickly using one or more idle sessions. In the process, one or more parent nodes may become re-defined as child nodes and child nodes as parent nodes. The idle session that becomes active is selected so that it does not lead to loops in the resulting re-formed tree.

If it is assumed for purposes of illustration that the root node 410a drops out, then one of the leftmost or rightmost nodes in the lowest level (e.g., node 410h or node 410o) is designated a new root node. Any method may be used to select one of the two. For purposes of illustration, it is assumed that node 410o is selected as the new root. Node 410o is now the parent of node 410g, not its child. Node 410n stays the child of node 410g, but node 410c becomes the child of node 410g not its parent. Node 410f stays the child of node 410c; and node 410L and node 410m remain children of node 410f. Node 410b and it progeny are not connected to the new root 410o. A session could be negotiated with node 410b to make node 410b a child of node 410o, but an idle session already exists between node 410o and 410h. Thus it is much more efficient to make node 410h the child of node 410o. This session can be activated because it does not lead to any loops back to node 410o, since node 410a has exited the conference. Once node 410h is made a child of the new root node 410o, node 410d changes its parent from node 410b to node 410h. Node 410d becomes the parent not the child of node 410b. The other nodes retain their current parent and child nodes. Neither node 410b nor node 410c is made the new root and connected to its sibling because then the new root would have three children, in violation of a design constraint to keep the tree a binary tree. In other embodiments in which the tree is not so constrained to be binary, one of nodes 410b and 410c is selected as the new root, and the idle session between them becomes active. No other nodes would redefine any of their parent-child relationships.

One or more new idle sessions are negotiated, which reflect the new arrangement of the tree.

If it is assumed for purposes of illustration that a leaf node drops out, then no further changes to active sessions are initiated. One or more idle sessions may be changed. For example, if node 410k drops out, then node 410j loses one idle session and establishes a new idle session with node 410L. Nodes with which to establish idle connections may be found in any manner. For example, in some embodiments, each node receives data that indicates the connections among all the nodes and that data is used to identify and contact the node with which an idle session is to be set up. In some embodiments, node 410j sends a request to its parent, which identifies the next node or forwards the request to its parent until the next node in the generation of node 410j is found. The request thus is forwarded from node 410j to node 410e to node 410b to node 410a, to node 410c, to node 410f. Node 410f determines that its first child is node 410L and responds to node 410j, either directly based on its network address or via a return sequence of answers to node 410c to node 410a to node 410b to node 410e and finally to node 410j.

If it is assumed for purposes of illustration that a parent of a leaf node drops out, then up to two leaf nodes are orphaned. In the illustrated embodiment, each orphaned leaf node has an idle session with an adjacent node that is not a sibling. Each orphaned node makes active the idle session not with its sibling and becomes a child of node connected by that session. For example, if node 410e drops out, node 410j uses an extant idle session to become a child of node 410i and node 410k uses an extant idle session to become a child node of node 410k.

If it is assumed for purposes of illustration that a node that is neither a root node nor a leaf node nor a parent of a leaf node drops out, then up to two sub-trees become orphaned. One outermost node at the lowest level of both orphaned sub-tree is made a root node of the sub-tree (changing parent-child relationships as desirable in the nodes of the orphaned sub-tree). Any method may be used to select the new root node. In an illustrated embodiment, a root node is selected that has an idle session to a node closest to a parent node of the node that dropped out. The new root makes that idle session active to become a child of that node. If the closest node is not the parent of the node that dropped out, then a new session also is negotiated with the parent to replace the session currently used. A leaf node of the still orphaned sub-tree makes active an idle session to the adjacent leaf node in the sub-tree with the new root. In some embodiments a tree balancing algorithm is applied to reconfigure a tree into a shallower version.

For example, if node 410b, drops out, two orphaned sub-trees under nodes 410d and 410e, respectively, are no longer connected to the other nodes in the real-time data conference. A session with node 410a, the parent of the dropped out node 410b, is desirable. Node 410h is a leaf node in the left orphan sub-tree that has an idle session with the desired target node 410a. Therefore, node 410h is made the new root for the orphaned sub-trees. The idle session from node 410h to node 410a is made active, and node 410h becomes a child of node 410a. The tree is still binary because node 410b is gone. The sub-tree of node 410e is joined to sub-tree of node 410d with the new root node 410h by making active the idle session between root node 410i and node 410j. Node 410j becomes the parent node for node 410e, If a node that drops out subsequently revives and requests to rejoin the conference, it may be re-directed to join as a leaf node at the bottom of the new tree, depending on the measure of affinity used. Thus unreliable nodes, or nodes with unreliable connections, have a tendency to migrate toward leaf node positions where failures have less impact.

4.0 Method at Distributed Mixing Peer

Figure 6A:
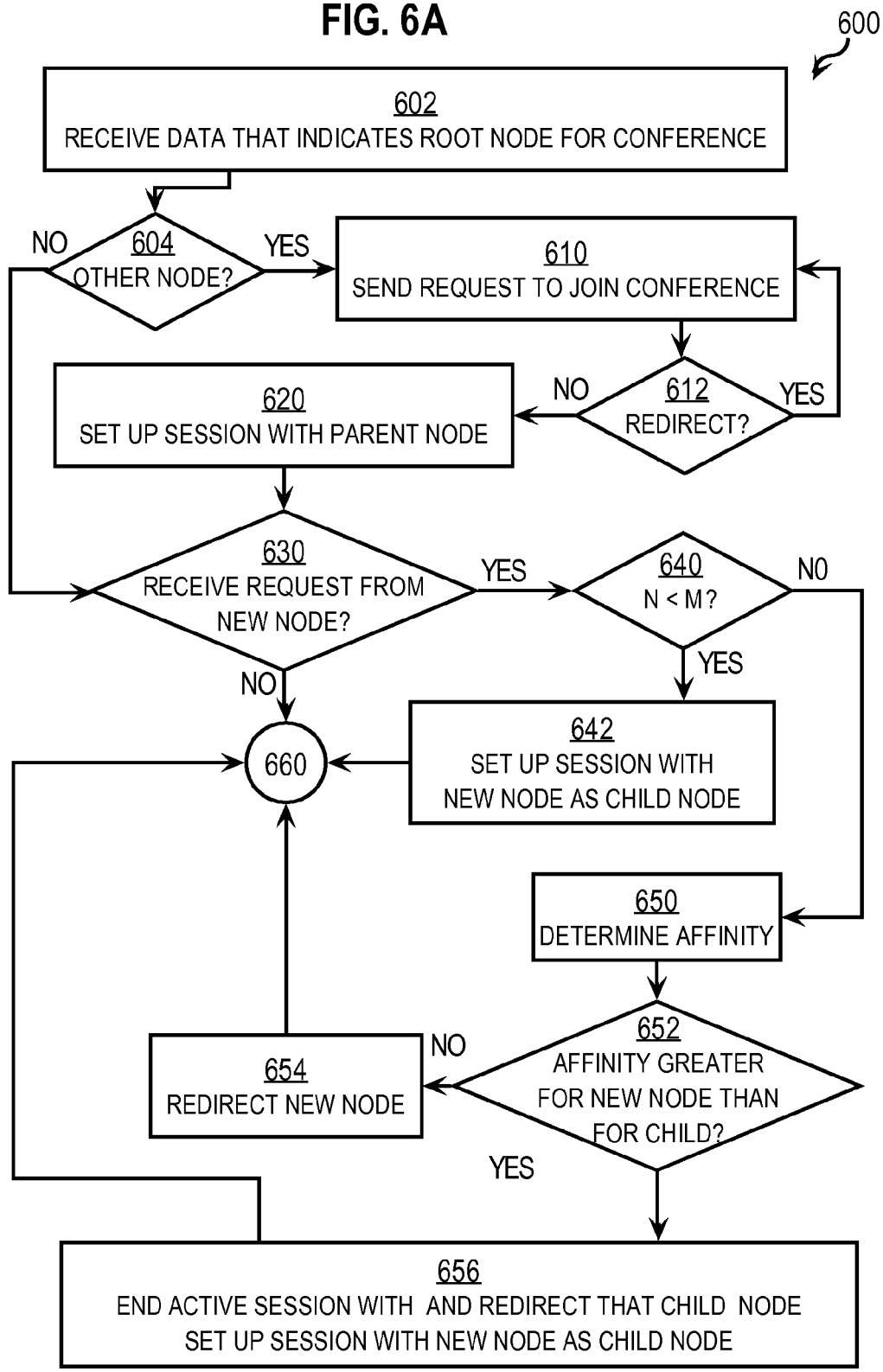
FIG. 6B illustrates an example method for a step of the method of FIG. 5.
Figure 6B:
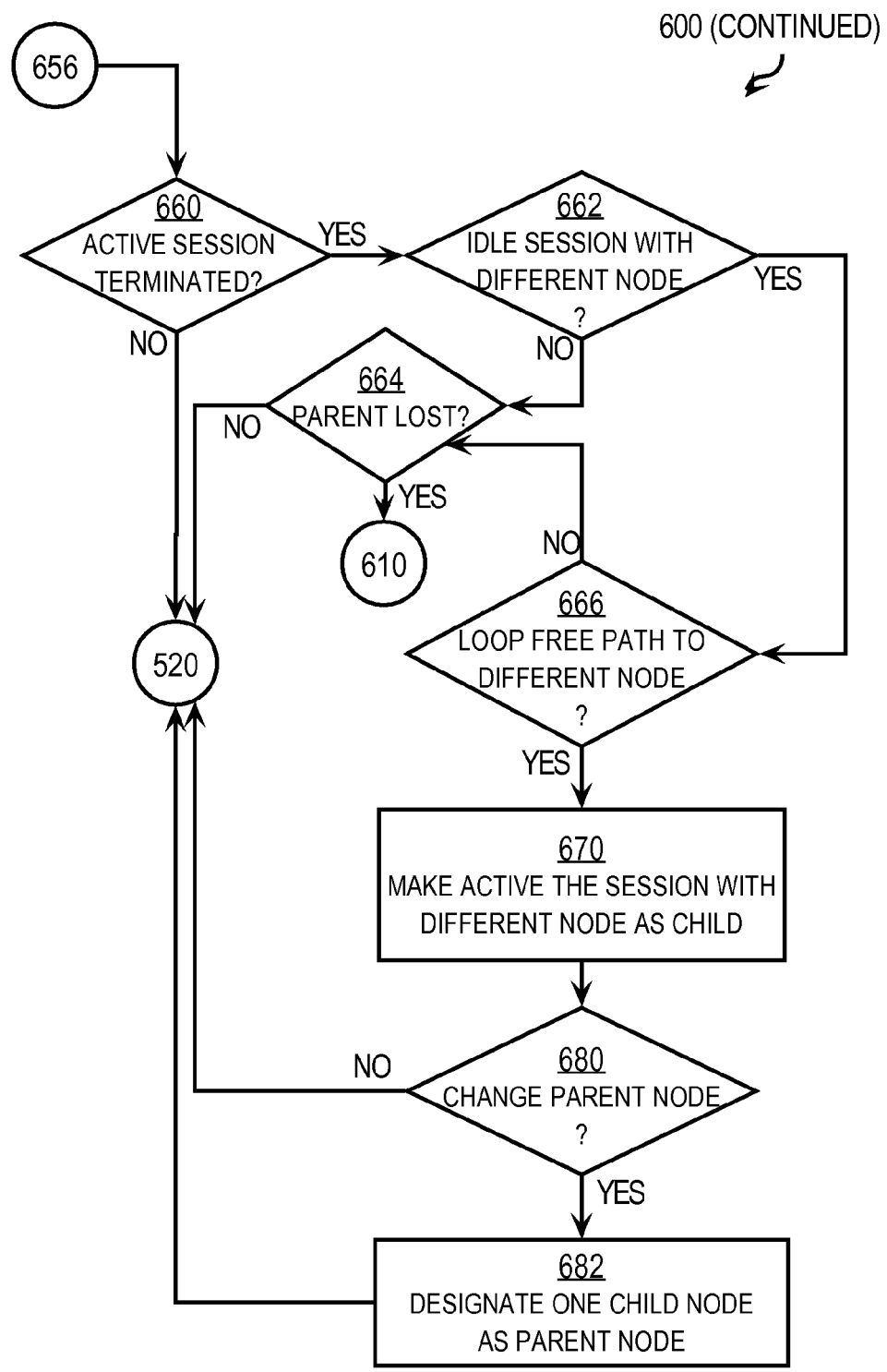

FIG. 5 illustrates at a high level an example method 500 for each node in the distributed real-time conferencing system. Although steps in FIG. 5 and subsequent flow diagrams, FIG. 6A and FIG. 6B, are shown in a particular order for purposes of illustration, in other embodiments, one or more steps may be performed in a different order or overlapping in time, in series or in parallel, or one or more steps may be omitted or added, or changed in some combination of ways.

In step 502, data is received that indicates a maximum number M of active real-time data sessions to be established at the node. The node may be an end node where real-time data is generated by a user or presented to a user, or both, or an intermediate network node, such as a router connected to multiple end nodes or other intermediate network nodes. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

In step 510 one or more active real-time data sessions are established with corresponding peer nodes, which sessions do not cause a loop among paths connecting peer nodes for a real-time data conference. Any method may be used to form loop-free paths among all peer nodes connected for a real-time data conference. At least one of the peer nodes connected by the active sessions is configured to mix real-time data received from multiple sources. Any peer node may be an end node or an intermediate network node. Some embodiments of step 510 are described in more detail below with reference to FIG. 6A and FIG. 6B. The number N of active sessions established during step 510 is less than or equal to M.

In step 520, one or more idle sessions are established with a corresponding peer node with which the node does not have an active session. In some embodiments, step 520 is omitted. Any method may be used to identify peer nodes with which to establish idle sessions, such as described above with reference to FIG. 4B for a binary tree of session paths.

In step 530, real-time data is received over up to N active sessions.

In step 540 a mix of the real-time data received over the up to N active sessions is presented to a user of the local node. For example, a mix of input 320a, input 320b, input 320c is output as output 333 over local connection 313 and presented at an audio speaker in telephone 311. For audio data that is encoded for transport in IP data packets, no encoding is necessary for output to local device 311. For nodes that are not end nodes, step 540 is omitted.

Audio data mixing is accomplished by adding sound pressure amplitudes at every point representing a time sample. For other real-time data, mixing is accomplished by the same or a different method. Any method known in the art for mixing real-time data may be used. For example, in some embodiments, video data is mixed by directing data representing a pixel from one source into one portion of a presentation screen, e.g., pictures from eight sites are displayed in eight different panels on the presentation display. In some embodiments, pixels from one source are put into one plane of several video planes that are superposed in a particular order at the presentation screen. In some embodiments pixel values from different sources are averaged or summed in each of three colors. In some embodiments different colors are provided by different sources.

In step 550 local real-time data is received. For example, audio signal input 323 is received over local connection 313 from a microphone in telephone 311. For nodes that are not end nodes, step 550 is omitted.

In step 560, received real-time data is distributed over the active sessions. In the illustrated embodiment, step 560 includes step 562 and step 564, and step 564 includes step 566 and step 568. In step 562 real-time data received over an active session is decoded. For example, audio data sent as MP3 is decoded into an audio pressure time series. As a further example, video data sent as MPEG is decoded into pixel time series. The output of the decode process becomes the inputs to the mixing process, e.g., the inputs 320a, 320b, 320c depicted in FIG. 3B. In step 564, output for the N active sessions are made by mixing inputs and encoding and sending the mixed data. In step 566 the local real time data is mixed with the decoded real-time data received from all but a particular one of the active sessions. For example, the local input 323 is mixed with all the inputs received over active sessions except input 320a from active session 310a to form output 330a. In embodiments in which the node is not an end node, the local real time data input 323 is absent and is not mixed during step 566. In step 568, that mix is encoded and sent through the particular one of the active sessions. For example, the mix shown as output 330a, which excludes input 320a, is sent through session 310a. Steps 566 and step 568 are repeated for all N active sessions, either in series or in parallel or some combination in various embodiments.

Control passes back to step 530 to receive more real-time data over active sessions unless it is determined in step 570 that there has been a change in the peer nodes connected to the node on which the distributed mixing process is performing the method 500. If there is a change in one of the peer nodes connected, control passes back to step 510 to set up active sessions with the changed peer nodes to avoid loops in session paths.

FIG. 6A and FIG. 6B illustrate an example method 600 for a step 510 of the method of FIG. 5. Thus method 600 is one embodiment of step 510. Method 600 begins with step 602. In step 602, data is received that indicates a root node for the conference. Any method may be used to receive this data as described above for step 502. In some embodiments, the data received during step 602 includes data that indicates one or more nodes already connected, directly or indirectly, to the root node, if any.

It is first assumed for purposes of illustration that distributed mixing process 150a is executing on node 110a, so that node 110a is the local node. The user of node 110a wishes to initiate a voice conference (e.g., a chat) and that information is received as data at process 150a during step 602 from the user of node 110a. It is further assumed that the user of node 110a advertises to users of the other seven nodes that a voice conference is being initiated at his node. For example, user of node 110a sends an email with a network address for process 150a on node 110a to users of nodes 110b, 110c, 110d, 110e, 110f, 110g, 110h. It is further assumed that the maximum number M of active sessions with distributed mixing process 150a on node 110a is Ma=2 so that a binary tree hierarchy can be formed.

In step 604 it is determined whether the root node is different from the local node. If so, then control passes to step 610. In step 610 a request is sent to a non-local node to join a conference as a child node with that non-local node as the parent node. If the data received during step 602 indicates one or more nodes in addition to the root node, then the request sent in step 610 may be directed to a distributed mixing process 150 on any of those nodes indicated during step 602.

For example, at some later time when the established sessions are as depicted in tree 200, a distributed mixing process 150 on a new node may direct a request to the distribute mixing process 150a on the root node 110a based on the email sent by the user of the root node 110a or on any other node depicted in tree 200 and indicated in data received in the email during step 602.

In response to sending the request during step 610, a response is returned to the local node. In step 612 it is determined whether the response indicates a redirect, e.g., an instruction to request to join a different node that is identified in the redirect response. If so, control passes back to step 610 to send another request to a different non-local node. If the response is not a redirect, then control passes to step 620.

In step 620, the request to join the conference has been granted and the new local node forms a real-time data session with the non-local node. The new local node is the child node and the non-local node is the parent node. Control then passes to step 630.

If it is determined in step 604 that the local node is the root node, then control passes directly to step 630. The root node does not execute step 610, step 612 or step 620. The root node is a parent node waiting for a child node to request joining the conference by establishing a real-time data session.

For example, the distributed mixing process 150a executing on node 110a receives data in step 602 that indicates the root node is node 110a. In step 604, the process 150a determines that the root node is the local node and control passes to step 630.

In step 630, it is determined whether a request is received at the local node from a new non-local node to join the conference at the local node. If not, then control passes to step 660, described below to deal with termination of a session, if any.

If it is determined, in step 630, that a request is received at the local node from a new non-local node to join the conference at the local node, then control passes to step 640. In step 640, it is determined whether the number N of active sessions already established at the local node is less than the maximum M for the local node. If so, control passes to step 642. In step 642, the request is granted and the new node is allowed to establish a real-time data session with the local node in which the new node is the child node and the local node is the parent node. The number N of active sessions is incremented by one during step 642. Control then passes to step 660.

For example, when distributed mixing process 150b on node 110b requests to join the conference at node 110a, the process 150a determines that Na=0, that Na<Ma=2, and therefore control passes to step 642. Session 410 between nodes 110a and 110b is established and Na is incremented so that Na=1. Similarly, when distributed mixing process 150b on node 110b requests to join the conference at node 110a, the process 150a determines that Na=1, that 1<Ma=2, and therefore control passes to step 642. Session 410 between nodes 110a and 110c is established and Na is incremented so that Na=2.

If it is determined in step 640, that N is not less than M, i.e., that the local node can form no more active sessions, then control passes to step 650. In step 650 a measure of affinity is determined. Any measure of affinity may be used, such as those described above based on latency or reliability of traffic or number of hops through intermediate network nodes between the local node and the new node, or importance of a social relationship between a user of the new node and a user of the local node, or some combination expressed, for example, as a Voronoi coordinate.

In step 652, it is determined whether the measure of affinity is greater for the new node than for an existing child node of the local node. If not, control passes to step 654 to redirect the new node.

In step 654, the new node is directed to attempt to join the conference at another node already participating in the conference. Any method may be used to redirect the new node. For example, in some embodiments, a redirect message is sent to the new node that indicates a network address of a node 110 or distributed mixing process 150 on any child node of the local node. In some embodiments, a redirect message is sent to the new node that indicates a network address of a node 110 or distributed mixing process 150 on any node indicated in information about the tree paths accumulated at the distributed mixing process of the local node. In some embodiments, a redirect message is sent to the new node that indicates a network address of a node 110 or distributed mixing process 150 based on affinity information about the nodes already in the conference (which information has accumulated at the distributed mixing process of the local node). Control then passes to step 660.

If it is determined, in step 652, that the measure of affinity is greater for the new node than for an existing child node of the local node, then control passes to step 656. In step 656, an active session is terminated with a child node that has less affinity for the local node than the new node has for the local node. The child of the terminated session is redirected to join the conference at a different node. Any method may be used. For example, any of the methods described in step 654 for the new node may be applied to redirect the terminated child node in step 656. During step 656, a real-time data session is established between the new node and the local node, with the local node the parent node and the new node the child node. Control then passes to step 660.

For example, when distributed mixing process 150d on node 110d requests to join the conference at node 110a, the process 150a determines in step 640 that Na=2, that Na=Ma=2 and therefore control passes to step 650. It is further assumed for purposes of illustration that affinity decreases with increased time after the local node joins the conference. Thus, in step 650 the affinity of the node 10d for the local node 110a is decreased based on the time since the local node 110a became the root node. In step 652, it is determined that the affinity for the new node 110d is less than the affinity of the extant child nodes 110b and 110c. Therefore, control passes to step 654 to redirect the new node 110d to a child node 110b of local node 110a.

In some embodiments, step 650 and 652 and step 656 are omitted and control passes directly to step 654 to redirect the new node.

In some embodiments, affinity among multiple nodes already in the tree is determined before step 640. It is then determined whether affinity is greater for a different node than the local node. If so, the new node is redirected to the different node even if N<M.

Steps 660 and following are depicted in FIG. 6B. In step 660 it is determined whether an active session has been terminated. If not, method 600 is completed and control passes to step 520, and subsequent steps described above with reference to FIG. 5, to mix real time data received over the active sessions. Control returns to method 600 when the next change in peer nodes available is detected in step 570, as indicted, for example, by a new request or sign of termination that is received at the local node.

If it is determined, in step 660, that an active session has been terminated, control passes to step 662. In step 662, it is determined whether the local node has an idle session already established with a different node from any in the connected set. If not, control passes to step 664.

In step 664, it is determined whether the terminated session has caused the local node to lose its parent. If so, then control passes to step 610, described above, to request to join the conference as a child node of another node already in the conference. If not, then the terminated session is with a child node and is not repaired; and control passes to step 520 to carry on with the nodes still connected by an active session. It becomes the duty of any severed child node that loses its parent node to seek to join the conference again as a child of another node.

For example, if it is assumed that the node 110b is lost from binary tree 400, with no idle sessions, then the root 110a does not seek to rejoin the children of the departed node 110b and become a child of one of them. Instead, each child node 110d and 110e requests the root node 110a to allow them to rejoin the conference as a child node with the root node as the parent node. One is accepted as a child of the root node 110a, the other becomes the child of the first.

If it is determined, in step 662, that the local node has an idle session already established, then control passes to step 666. In step 666, it is determined whether one of the idle sessions provides a loop free path to the different node. If not, then none of the idle sessions is useful, and control passes to step 664 as if there were no idle sessions.

If it is determined, in step 666, that one of the idle sessions provides a loop free path to the different node, then control passes to step 670. In step 670 the idle session is made active, with the different node as the child and the local node as the parent. Control then passes to step 680.

In step 680, it is determined whether conditions are satisfied for changing a parent node. If not, no parent-child relationships are changed. If so, at least one child is changed to a parent or one parent is changed to a child. Control then passes to step 520.

For example, if the local node ends up with two parents or a non-root node ends up with no parents, then one or more nodes connected to the local node is changed from child to parent or vice versa. As described above for binary tree 402 with idle sessions, when the root node 410a drops out, node 410o is made the root node with no parent and the idle session with node 410h is made active. When node 110o is the local node, it should have no parents. Thus node 410g, currently the parent of node 410o, is changed from parent node to child node of the local node 410o.

5.0 Implementation Mechanisms—Hardware Overview

Figure 7:
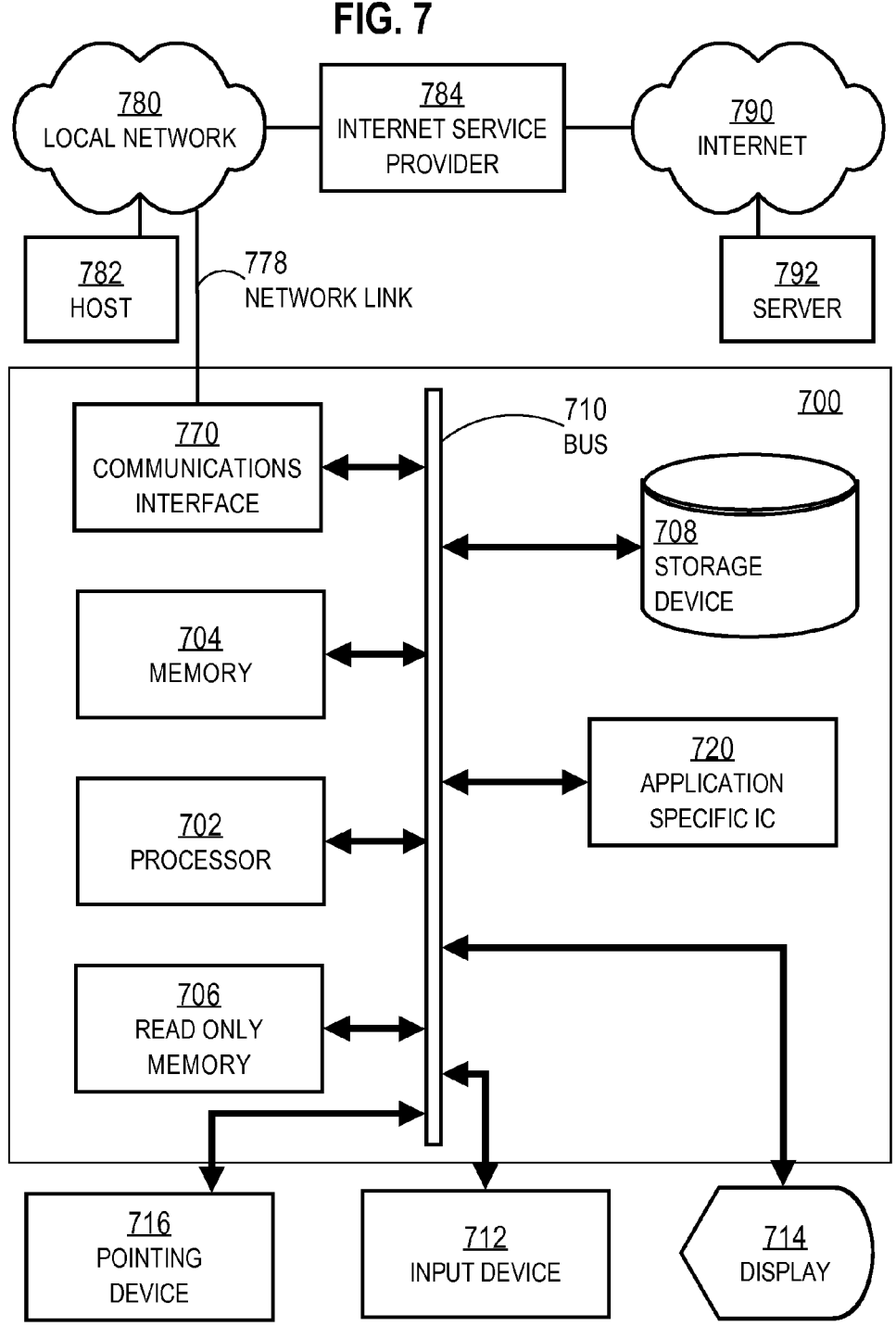
FIG. 7 illustrates a computer system upon which an embodiment of the invention may be implemented.

FIG. 7 illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, which carry information to and from computer system 700, are example forms of carrier waves. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
receiving, at a first node in a network, a request from a second node to join a conference, wherein the first node is associated with a maximum number of nodes configured to establish data sessions, wherein the conference is associated with a conference number of nodes, and wherein the conference number of nodes is greater than the maximum number of nodes;
establishing a data session between the first node and the second node;
receiving, at the first node, real-time data from a plurality of nodes associated with the conference;
mixing, at the first node, the real-time data to generate a mixed data stream; and
sending the mixed data stream to the second node.

2. The method of claim 1, further comprising:
receiving, at the first node, real-time data from the second node;
mixing, at the first node, the real-time data from the plurality of nodes with the real-time data from the second node to generate a second mixed data stream; and
providing the second mixed data stream to an output device associated with the first node.

3. The method of claim 1, further comprising:
establishing a number of data sessions between the first node and the plurality of nodes; and
forming a hierarchy between the first node and the plurality of nodes, wherein each of the plurality of nodes is connected to the first node by at most one path for the conference.

4. The method of claim 3, further comprising receiving, at the first node, one or more mixed data streams generated at the plurality of nodes without receiving the mixed data stream generated at the first node.

5. The method of claim 3, further comprising:
receiving, at the first node, a request from a third node to join the conference;
determining, in response to receiving the request, whether the data sessions associated with the maximum number of nodes have already been established; and
in response to determining that the data sessions have already been established, directing either the third node or an other node of the plurality of nodes to establish a data session with a different node associated with the conference.

6. The method of claim 5, wherein the conference is organized as a loop-free hierarchy of nodes comprising a root node, end-point nodes, and intermediary nodes connecting the root node with the end-point nodes, wherein each of the intermediary nodes is associated with at most one parent node and at least one child node, and wherein the different node comprises a parent node of the first node.

7. The method of claim 5, wherein the conference is organized as a loop-free hierarchy of nodes comprising a root node, end-point nodes, and intermediary nodes connecting the root node with the end-point nodes, wherein each of the intermediary nodes is associated with at most one parent node and at least one child node, and wherein the different node comprises a child node of the first node.

8. The method of claim 5, further comprising:
comparing, at the first node, a measure of affinity between the first node and the third node with a measure of affinity between the first node and the other node; and
selecting, in response to said comparing, a node associated with a smallest measure of affinity, wherein the selected node is directed to establish the data connection with the different node.

9. The method of claim 8, wherein the measure of affinity is associated with a latency of data packet arrival at the first node.

10. The method of claim 8, wherein the measure of affinity is determined by a social relationship associated with the third node and the first node.

11. The method of claim 1, further comprising:
receiving, at the first node, a request from a third node to join the conference;
comparing, at the first node, a measure of affinity between the third node and the first node with a measure of affinity between the first node and one of the plurality of nodes to identify a node associated with a smallest measure of affinity; and
directing, in response to said comparing, the node associated with the smallest measure of affinity to establish a data session with a different node.

12. The method of claim 1, further comprising:
determining that the data session is terminated with the second node; identifying an idle data session between the first node and a third node; and
establishing an active data session with the third node in response to determining that the data session with the second node is terminated.

13. The method of claim 12, wherein the conference is organized as a loop-free hierarchy of nodes comprising a root node, end-point nodes, and intermediary nodes connecting the root node with the end-point nodes, wherein each of the intermediary nodes is associated with at most one parent node and at least one child node, and wherein, in response to determining that the data session is terminated, the first node is re-defined as a child node of the third node and the third node is re-defined as a parent node of the first node.

14. An apparatus, which is a first node in a packet switched network, the apparatus comprising:
a network interface configured for communicating a data packet with a packet-switched network; and
a processing device coupled to the network interface, wherein the processing device is configured to:
receive a request from a second node to join a conference, wherein the first node is associated with a maximum number of nodes configured to establish data sessions, wherein the conference is associated with a conference number of nodes, and wherein the conference number of nodes is greater than the maximum number of nodes;
establish a data session between the first node and the second node;
receive, at the first node, real-time data from a plurality of nodes associated with the conference;
mix, at the first node, the real-time data to generate a mixed data stream; and
send the mixed data stream to the second node.

15. The apparatus of claim 14, wherein the processing device is further configured to:
mix real-time data from the plurality of nodes with the real-time data from the second node to generate a second mixed data stream; and
provide the second mixed data stream to an output device associated with the first node.

16. The apparatus of claim 14, wherein the processing device is further configured to:
establish a number of data sessions with the plurality of nodes; and
form a hierarchy with the plurality of nodes, wherein each of the plurality of nodes is connected to the first node by at most one path for the conference.

17. The apparatus of claim 16, wherein the processing device is further configured to:
forward one or more mixed data streams generated at the plurality of nodes without receiving the mixed data stream generated at the first node.

18. The apparatus of claim 17, wherein the processing device is further configured to:
determine that the data session is terminated with the second node;
identify an idle data session between the first node and a third node; and
establish an active data session with the third node in response to determining that the data session with the second node is terminated.

19. The apparatus of claim 14, wherein the processing device is further configured to:
process a request from a third node to join the conference;
determine, in response to receiving the request, whether the data sessions associated with the maximum number nodes have already been established; and
in response to determining that the data sessions have already been established, direct either the third node or an other node of the plurality of nodes to establish a data session with a different node associated with the conference.

20. The apparatus of claim 19, wherein the conference is organized as a loop-free hierarchy of nodes comprising a root node, end-point nodes, and intermediary nodes connecting the root node with the end-point nodes, wherein each of the intermediary nodes is associated with at most one parent node and at least one child node, and wherein the different node comprises a parent node of the first node.

21. The apparatus of claim 19, wherein the conference is organized as a loop-free hierarchy of nodes comprising a root node, end-point nodes, and intermediary nodes connecting the root node with the end-point nodes, wherein each of the intermediary nodes is associated with at most one parent node and at least one child node, and wherein the different node comprises a child node of the first node.

22. The apparatus of claim 19, wherein the processing device is further configured to:
  compare a measure of affinity between the first node and the third node with a measure of affinity between the first node and the other node; and
  select, in response to said comparing, a node associated with a smallest measure of affinity, wherein the selected node is directed to establish the data connection with the different node.

23. The apparatus of claim 22, wherein the measure of affinity is associated with a latency of data packet arrival at the network interface.

24. The apparatus of claim 22, wherein the measure of affinity is determined by reliability of data packet arrival associated with the third node and the first node.

25. The apparatus of claim 14, wherein the processing device is further configured to:
  receive a request from a third node to join the conference;
  compare, a measure of affinity between the third node and the first node with a measure of affinity with one of the plurality of nodes to identify a node associated with a smallest measure of affinity; and
  direct, in response to said comparing, the node associated with the smallest measure of affinity to establish a data session with a different node.

26. A memory device having instructions stored thereon that, in response to execution by a processing device, cause the processing device to perform operations comprising:
  receiving data that indicates a maximum number of nodes with which to set up a real-time data session that is less than a conference number of nodes whose data is mixed in a single real-time data conference;
  setting up the real-time data session with a connected set of nodes, wherein the connected set includes a connected number of nodes not greater than the maximum number of nodes;
  receiving real-time data from up to all nodes in the connected set; and
  distributing the received real-time data by performing, for each individual node in the connected set, the steps of:
    mixing real-time data received from up to one less than the connected number of other nodes in the connected set different from the individual node to form individual mixed real-time data, and
    sending the individual mixed real-time data to the individual node.

27. An apparatus, comprising:
  means for receiving a request from a network node to join a conference;
  means for establishing a data session with the network node;
  means for receiving real-time data from a plurality of nodes associated with the conference;
  means for mixing the real-time data to generate a mixed data stream; and
  means for sending the mixed data stream to the network node.

* * * * *